(12) United States Patent
Lai (10) Patent No.: US 12,355,113 B2
(45) Date of Patent: Jul. 8, 2025

(54) FUEL CELL HAVING AN ENERGY ATTENUATING BEAD

(71) Applicant: GM Global Technology Operations LLC, Detroit, MI (US)

(72) Inventor: Yeh-Hung Lai, Oakland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 382 days.

(21) Appl. No.: 17/402,878

(22) Filed: Aug. 16, 2021

(65) Prior Publication Data

US 2023/0052796 A1     Feb. 16, 2023

(51) Int. Cl.
*H01M 8/00*         (2016.01)
*H01M 8/0247*       (2016.01)
(Continued)

(52) U.S. Cl.
CPC ....... *H01M 8/0247* (2013.01); *H01M 8/0267* (2013.01); *H01M 8/0276* (2013.01); *H01M 8/242* (2013.01); *H01M 2250/20* (2013.01)

(58) Field of Classification Search
CPC ... H01M 8/0276; H01M 8/0271–0286; H01M 8/0247; H01M 8/0267;
(Continued)

(56) References Cited

U.S. PATENT DOCUMENTS 7,709,123 B2    5/2010  Kawabata et al.
9,093,697 B2 *  7/2015  Uehara .................. H01M 8/248
(Continued)

FOREIGN PATENT DOCUMENTS

CN    101414670 A    4/2009
CN    213483785 U    6/2021
(Continued)

OTHER PUBLICATIONS

"Parts of a Fuel Cell" by the Hydrogen and Fuel Cell Technologies Office of the U.S. Department of Energy, as accessible on Jun. 14, 2021 (Year: 2021).*
(Continued)

*Primary Examiner* — Nicholas P D'Aniello
(74) *Attorney, Agent, or Firm* — CANTOR COLBURN LLP (57) ABSTRACT

A fuel cell system includes a plurality of stacked bipolar plate assemblies. Each of the plurality of stacked bipolar plate assemblies includes a first subgasket including a first peripheral edge. The first subgasket supports a first membrane electrode assembly (MEA). A second subgasket including a second peripheral edge. The second subgasket supports a second MEA. A bipolar plate is disposed between the first subgasket and the second subgasket. The bipolar plate has a first side defining a first plurality of passages receptive of a cathode fluid, a second side defining a second plurality of passages receptive of an anode fluid, and a plurality of coolant passages defined between the first subgasket and the second subgasket. A seal bead extends around the bipolar plate. The seal bead seals against the first subgasket and the second subgasket. An energy attenuating bead extends about the bipolar plate spaced from the seal bead.

20 Claims, 4 Drawing Sheets

(51) Int. Cl.
*H01M 8/0267* (2016.01)
*H01M 8/0276* (2016.01)
*H01M 8/242* (2016.01)

(58) Field of Classification Search
CPC ............ H01M 8/242; H01M 2250/20; H01M 8/0206; H01M 8/0273; H01M 8/1004; H01M 8/241; H01M 8/2483; H01M 2008/1095; Y02E 60/50
See application file for complete search history.

(56) References Cited

U.S. PATENT DOCUMENTS

| | | | |
|---|---|---|---|
| 10,601,063 B2 | 3/2020 | Rock et al. | |
| 11,380,909 B2 | 7/2022 | Sano et al. | |
| 11,855,314 B2 | 12/2023 | Wenzel et al. | |
| 2002/0102453 A1* | 8/2002 | Suenaga | H01M 8/2483 429/465 |
| 2009/0004537 A1* | 1/2009 | Yagami | H01M 8/0273 429/465 |
| 2009/0004540 A1* | 1/2009 | Shizuku | H01M 8/0273 429/465 |
| 2009/0130519 A1* | 5/2009 | Sato | H01M 8/0228 429/480 |
| 2014/0162164 A1* | 6/2014 | Jin | H01M 8/0267 429/514 |
| 2015/0372321 A1 | 12/2015 | Araki et al. | |
| 2016/0079610 A1* | 3/2016 | Oku | H01M 8/241 429/482 |
| 2017/0317361 A1* | 11/2017 | Zillich | H01M 8/0258 |
| 2018/0123141 A1 | 5/2018 | Xi et al. | |
| 2018/0226663 A1* | 8/2018 | Ishida | H01M 8/0258 |
| 2021/0194020 A1* | 6/2021 | Suzuki | H01M 8/0206 |
| 2021/0202963 A1 | 7/2021 | Wenzel et al. | |

FOREIGN PATENT DOCUMENTS

| | | | |
|---|---|---|---|
| WO | WO-2011026537 A1 * | 3/2011 | ......... H01M 8/0273 |
| WO | 2019076813 A1 | 4/2019 | |

OTHER PUBLICATIONS

Chinese Office Action for Chinese Application No. 202210555966.6; dated Apr. 30, 2025; 2 pages.

* cited by examiner

FUEL CELL HAVING AN ENERGY ATTENUATING BEAD

INTRODUCTION

The subject disclosure relates to the art of fuel cells and, more particularly, to a fuel cell having an energy attenuating bead.

Fuel cells are used in a variety of vehicles to produce electric energy. The electric energy may be stored in a battery and/or directed to a motor to provide a motive force to the vehicle. In a typical fuel cell, such as a polymer electrolyte membrane fuel cell, an ion-transmissive membrane is sandwiched between a pair of catalyzed electrodes, which are further sandwiched between two gas diffusion layers to form a membrane electrode assembly (MEA). An electrochemical reaction occurs when a first reactant in the form of a gaseous reducing agent such as Hydrogen is introduced through a first gas diffusion layer to an anode electrode and ionized. The first reactant is then passed through the ion-transmissive material. After passing through the ion-transmissive material, the first reactant combines with a second reactant in the form of a gaseous oxidizing agent such as oxygen that has been introduced through a second gas diffusion layer to a cathode. The combination of reactants form water. Electrons liberated in the ionization proceed, in the form of DC current, to the cathode via an external circuit that typically includes a load such as an electric motor.

MEAs are typically formed into a stack to form a fuel cell. Adjacent MEA's are separated, one from another, by a series of reactant channels, typically in the form of a gas impermeable bipolar plate. The bipolar plate, in addition to promoting a flow of reactants, also provides support for the stack. Each bipolar plate includes one or more seal beads that prevent reactants from leaving the MEA. During a crash event, leading cells, those cells closest to a point of impact, experience an effective positive acceleration force and trailing cells, those cells farthest from the point of impact, experience an effective negative acceleration force. Thus, the leading cells tend to experience increasing seal force while the trailing cells tend to experience a decreasing seal force.

As the seal force on the leading cells increase, so does the risk of exceeding an upper sealing limit. Similarly, as the seal force on the trailing seals decrease, so does the risk of falling below a minimum seal force. Exceeding the upper limit or falling below the lower limit of the seal forces can cause seal beads to deform. Deformation of the seal bead impacts the integrity of each cell and could lead to leakage of the first reactant, the second reactant, and/or coolant. Accordingly, it is desirable to provide a fuel cell with an energy attenuating seal bead to improve structural integrity and impact resistance.

SUMMARY

Disclosed is a fuel cell system including a plurality of stacked bipolar plate assemblies. Each of the plurality of stacked bipolar plate assemblies includes a first subgasket including a first peripheral edge. The first subgasket supports a first membrane electrode assembly (MEA). A second subgasket including a second peripheral edge. The second subgasket supports a second MEA. A bipolar plate is disposed between the first subgasket and the second subgasket. The bipolar plate has a first side defining a first plurality of passages receptive of a cathode fluid, a second side defining a second plurality of passages receptive of an anode fluid, and a plurality of coolant passages defined between the first subgasket and the second subgasket. A seal bead extends around the bipolar plate. The seal bead seals against the first subgasket and the second subgasket. An energy attenuating bead extends about the bipolar plate spaced from the seal bead.

In addition to one or more of the features described herein the energy attenuating bead includes a first section extending about a first portion of the bipolar plate and a second section extending about a second portion of the bipolar plate.

In addition to one or more of the features described herein the first section is not connected to the second section.

In addition to one or more of the features described herein the seal bead is continuous about the bipolar plate.

In addition to one or more of the features described herein the seal bead includes a first stiffness and the energy attenuating bead includes a second stiffness that is distinct from the first stiffness.

In addition to one or more of the features described herein the second stiffness is between about one half that of the first stiffness and about 5 times greater than the first stiffness.

In addition to one or more of the features described herein the bipolar plate is formed from a metal.

In addition to one or more of the features described herein the bipolar plate is formed from a non-metal.

Also disclosed is a power system including an electric motor and a fuel cell system having a plurality of stacked bipolar plate assemblies. Each of the plurality of stacked bipolar plate assemblies includes a first subgasket including a first peripheral edge. The first subgasket supports a first membrane electrode assembly (MEA). A second subgasket includes a second peripheral edge. The second subgasket supports a second MEA. A bipolar plate is disposed between the first subgasket and the second subgasket. The bipolar plate has a first side defining a first plurality of passages receptive of a cathode fluid, a second side defining a second plurality of passages receptive of an anode fluid, and a plurality of coolant passages defined between the first subgasket and the second subgasket. A seal bead extends around the bipolar plate. The seal bead seals against the first subgasket and the second subgasket. An energy attenuating bead extends about the bipolar plate spaced from the seal bead.

In addition to one or more of the features described herein the energy attenuating bead includes a first section extending about a first portion of the bipolar plate and a second section extending about a second portion of the bipolar plate.

In addition to one or more of the features described herein the first section is not connected to the second section.

In addition to one or more of the features described herein the seal bead includes a first stiffness and the energy attenuating bead includes a second stiffness that is distinct from the first stiffness.

In addition to one or more of the features described herein the second stiffness is between about one half that of the first stiffness and about 5 times greater than the first stiffness.

In addition to one or more of the features described herein the bipolar plate is formed from a metal.

Further disclosed is a vehicle including a body and a power system arranged in the body. The power system includes an electric motor and a fuel cell system including a plurality of stacked bipolar plate assemblies. Each of the plurality of stacked bipolar plate assemblies includes a first subgasket including a first peripheral edge. The first subgasket supports a first membrane electrode assembly (MEA). A second subgasket includes a second peripheral edge. The second subgasket supports a second MEA. A bipolar plate is disposed between the first subgasket and the second subgasket. The bipolar plate has a first side defining a first plurality of passages receptive of a cathode fluid, a second side defining a second plurality of passages receptive of an anode fluid, and a plurality of coolant passages defined between the first subgasket and the second subgasket. A seal bead extends around the bipolar plate. The seal bead seals against the first subgasket and the second subgasket. An energy attenuating bead extends about the bipolar plate spaced from the seal bead.

In addition to one or more of the features described herein the energy attenuating bead includes a first section extending about a first portion of the bipolar plate and a second section extending about a second portion of the bipolar plate.

In addition to one or more of the features described herein the first section is not connected to the second section.

In addition to one or more of the features described herein the seal bead includes a first stiffness and the energy attenuating bead includes a second stiffness that is distinct from the first stiffness.

In addition to one or more of the features described herein the second stiffness is between about half that of the first stiffness and about 5 times greater than the first stiffness.

In addition to one or more of the features described herein the bipolar plate is formed from a metal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
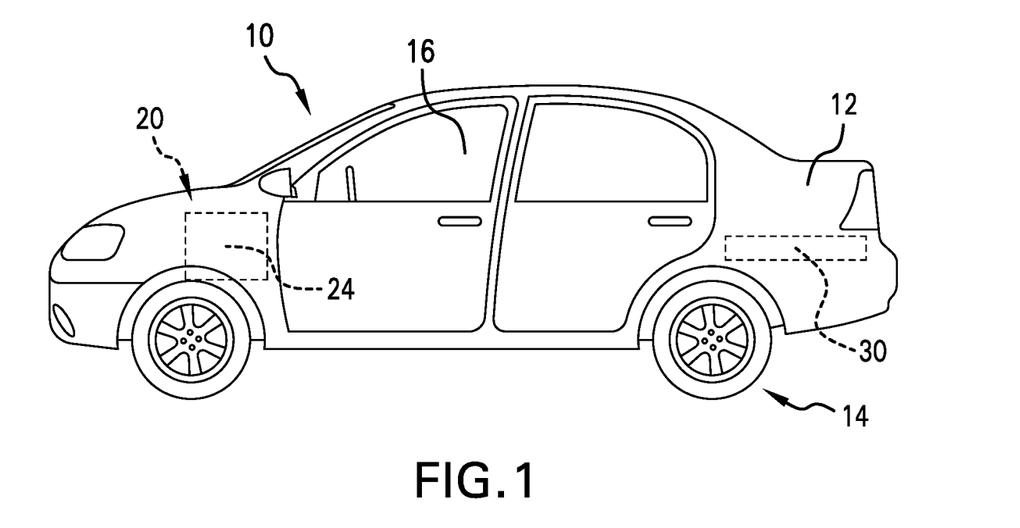
FIG. 1 depicts a vehicle including a power system having a fuel cell system with a plurality of stacked bipolar plate assemblies each having an energy attenuating bead, in accordance with a non-limiting example.
Figure 2:
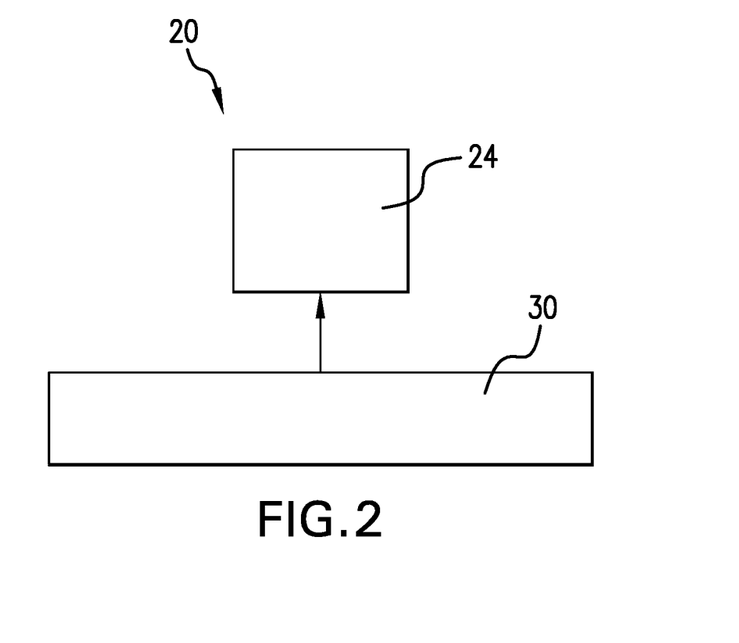
FIG. 2 is a block diagram depicting the power system of FIG. 1, in accordance with a non-limiting example.

A vehicle, in accordance with a non-limiting example, is indicated generally at 10 in FIG. 1. Vehicle 10 includes a body 12 resting on a plurality of wheels, one of which is indicated at 14. Vehicle 10 includes a passenger compartment 16. A power system 20 is operatively connected to one or more of the plurality of wheels 14. Referring to FIG. 2, power system 20 includes an electric motor 24 connected to a fuel cell system 30. Fuel cell system 30 provides electric power to operate electric motor 24 based on driver inputs. That is, a driver (not shown) seated in passenger compartment 16 may request power be delivered to wheels 14 from electric motor 24. At this point, it should be understood that while vehicle 10 is depicted as an automobile, fuel cell system 30, in accordance with non-limiting example, may be employed in a variety of vehicles including locomotives, airplanes, ships, and the like.

Figure 3:
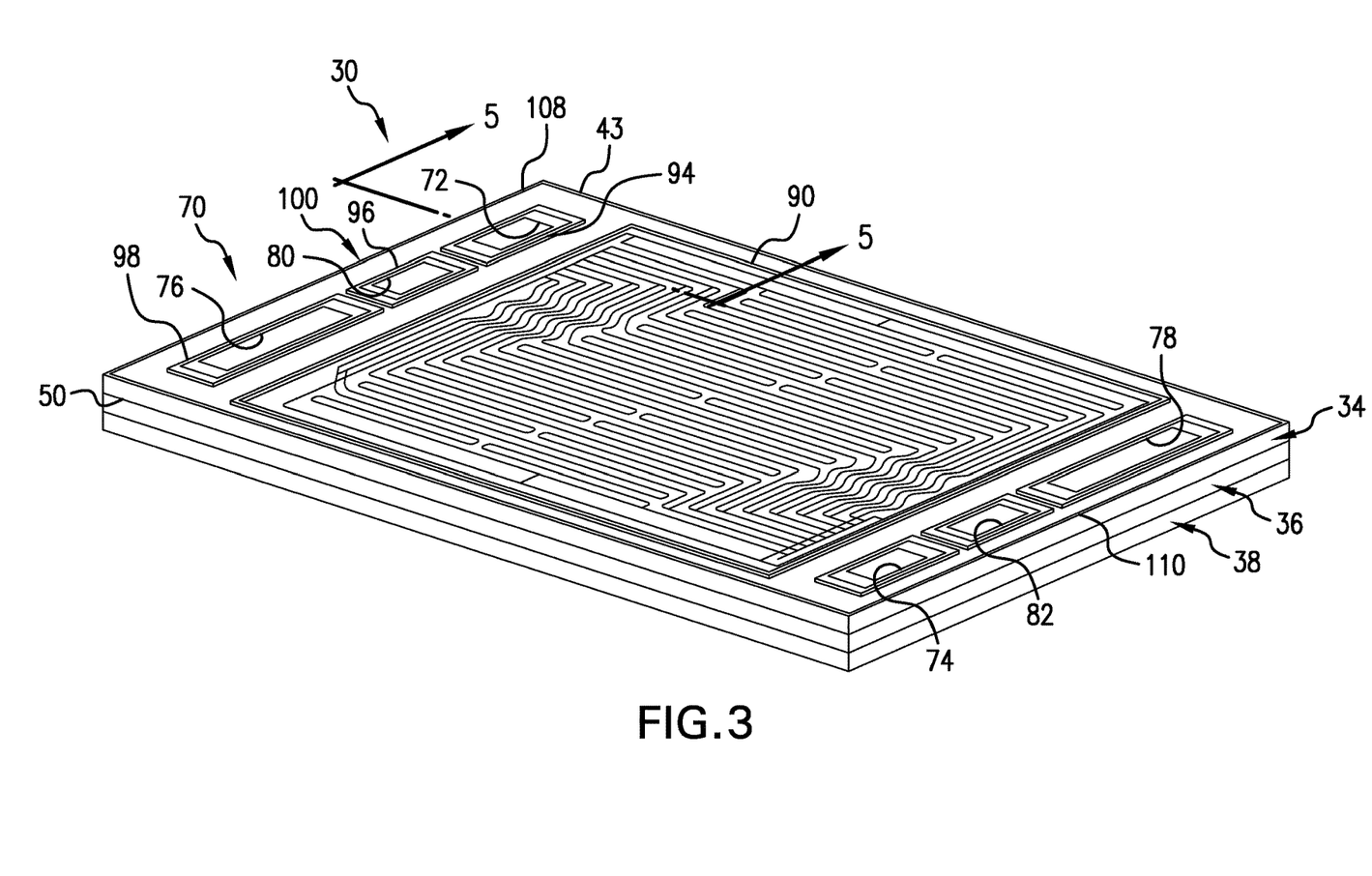
FIG. 3 depicts the stacked bipolar plate assemblies of the fuel cell system of FIG. 1, in accordance with a non-limiting example.
Figure 4:
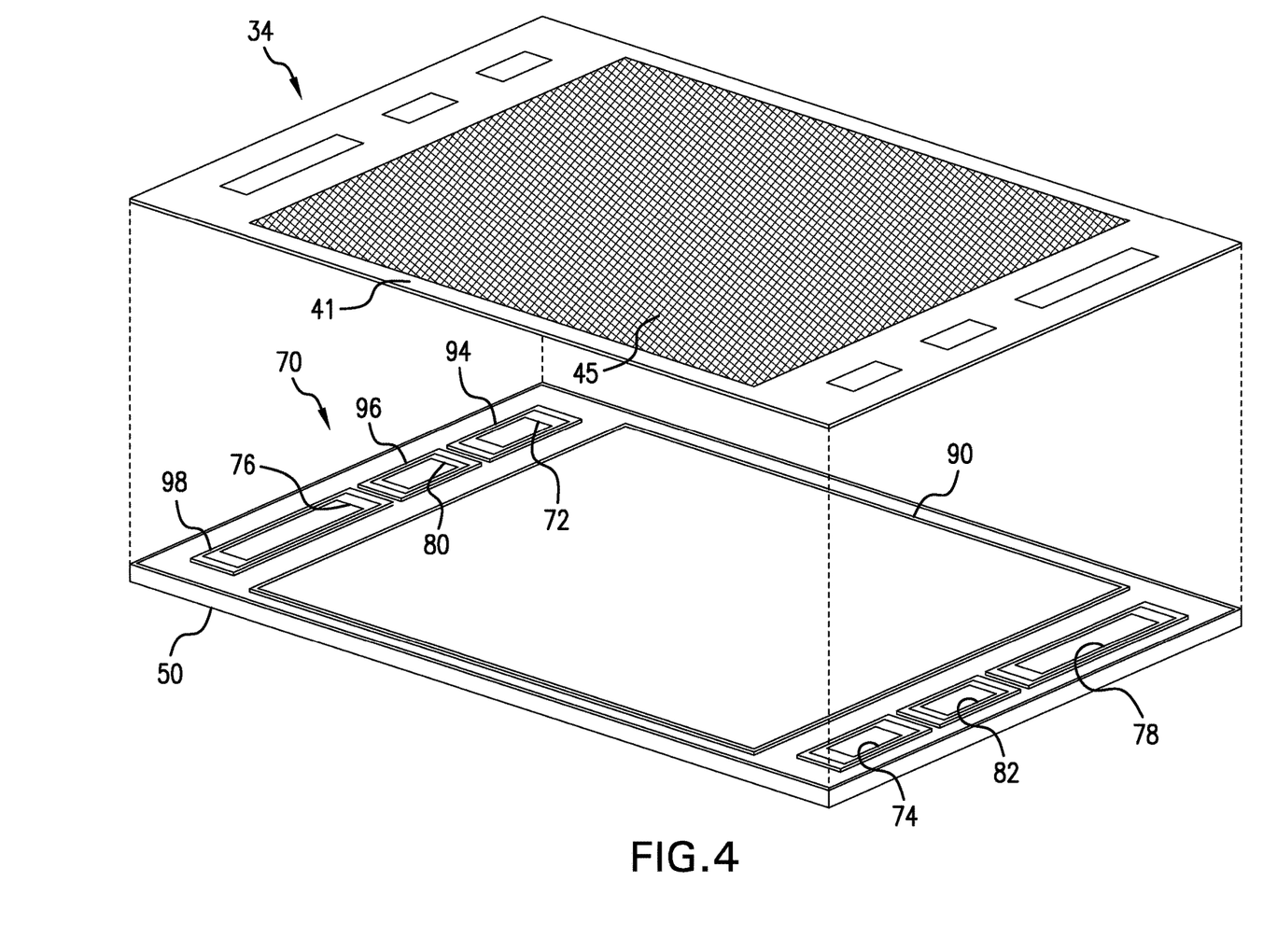
FIG. 4 is a partially disassembled view of one of the stacked bipolar plate assemblies in FIG. 3.
Figure 5:
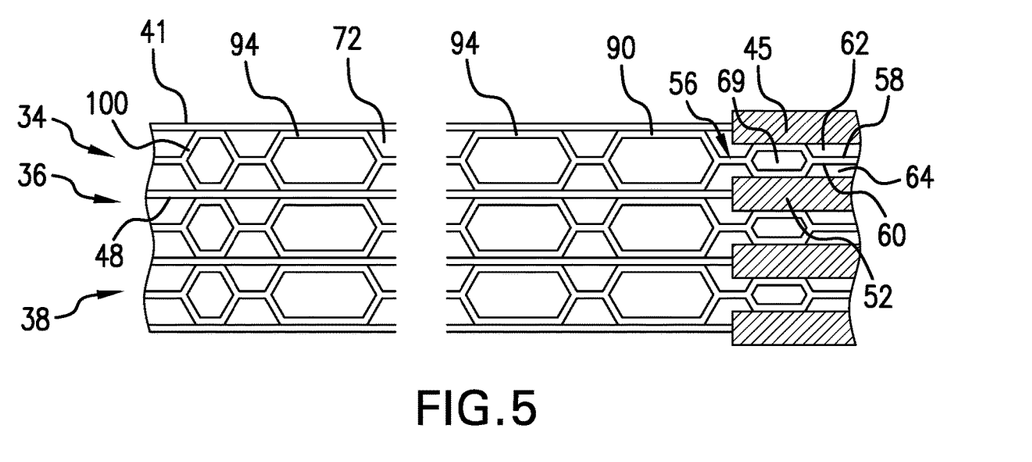
FIG. 5 depicts a partial top down cross-sectional view of the bipolar plate assemblies of FIG. 3 taken along the line 4-4, in accordance with a non-limiting example.

Reference will now follow to FIGS. 3 and 4 in describing fuel cell system 30 in accordance with a non-limiting example. Fuel cell system 30 is formed from a plurality of stacked and interconnected bipolar plate assemblies including a first bipolar plate assembly 34, a second bipolar plate assembly 36, and a third bipolar plate assembly 38. The number and arrangement of bipolar plate assemblies may vary. Reference will follow to FIG. 5 and with continued reference to FIGS. 3 and 4 in describing first bipolar plate assembly 34 with an understanding that second bipolar plate assembly 36 and third bipolar plate assembly 38 include similar structure.

First bipolar plate assembly 34 includes a first subgasket 41 having a first peripheral edge 43 and a first membrane electrode assembly (MEA) 45. First bipolar plate assembly 34 also includes a second subgasket 48 having a second peripheral edge 50. Second subgasket 48 includes a second MEA 52. As shown in FIG. 4, second subgasket 48 may define a surface of second bipolar plate assembly 36, and also a surface of first bipolar plate assembly 34. A bipolar plate 56 is positioned between first subgasket 41 and second subgasket 48. Bipolar plate 56 includes a first side 58 that defines a cathode side (not separately labeled) and a second side 60 that defines an anode side (also not separately labeled). In a non-limiting example, bipolar plate 56 may be formed from a metal. In another non-limiting example, bipolar plate 56 may be formed from a non-metal.

Bipolar plate 56 includes a plurality of corrugations (not separately labeled) that form a first plurality of passages 62 on first side 58. First plurality of passages 62 may contain a first reactant or cathode fluid (not shown) that would be in contact with a surface (not separately labeled) of first MEA 45. The corrugations also form a second plurality of passages 64 at second side 60. Second plurality of passages 64 may contain a second reactant or anode fluid (not shown) that is in contact with a surface (also not separately labeled) of second MEA 52. Bipolar plate 56 also includes a plurality of coolant passages 69 that may contain a coolant that absorbs heat from fuel cell system 30.

In further accordance with a non-limiting example, bipolar plate 56 includes a plurality of headers 70 that fluidically communicate with first plurality of passages 62, second plurality of passages 64, and coolant passages 69. More specifically, plurality of headers 70 include a first reactant inlet 72 and a first reactant outlet 74. Plurality of headers 70 also includes a second reactant inlet 76 and a second reactant outlet 78. Further, plurality of headers may include a coolant inlet 80 and a coolant outlet 82.

Bipolar plate 56 is further shown to include a perimeter seal bead 90 that extends entirely around first MEA 45, second MEA 52, as well as first plurality of passages 62, second plurality of passages 64, and coolant passages 69. Further each of the plurality of headers 70 includes an associated header seal bead such as shown at 94, 96, and 98 in connection with first reactant inlet 72, coolant inlet 80, and second reactant inlet 76. For example, seal bead 94 extends entirely about first reactant inlet 72, seal bead 96 extends entirely about coolant inlet 80, and seal bead 98 extends entirely about second reactant inlet 76. Seal beads 90, 94, 96, and 98 are disposed between first subgasket 41 and second subgasket 48. Seal bead 90 extends about first bipolar plate assembly 34. In this manner, seal bead 90 fluidically isolates bipolar plate assembly 34 from ambient. Seal beads 90, 94, 96, and 98 ensure fluid isolation between the first reactant, the second reactant, and coolant and/or ambient.

During a crash event, seal bead integrity may be compromised. A change of seal force during the crash event can be expressed as $$\Delta F\_leading \propto (\alpha N\, m\, a)/L; \text{ and} \quad \text{Equation 1}$$

$$\Delta F\_trailing \propto -(\alpha N\, m\, a)/L \quad \text{Equation 2}$$

where ΔF_leading is the change of seal force [N/mm] in the leading cells;
ΔF_trailing is the change of seal force [N/mm] in the trailing cells; N is the number of cell within the stack;
m is the mass per cell [g];
a is the peak acceleration during crash [mm/s$^2$];
α is the mass fraction of the cell applying over the seal area; and
L is the total seal length.

In order to reduce the absolute values of ΔF_trailing and ΔF_leading, one can either reduce the product (α N m a) or increase L. However, the quantity, (α N m a), is typically a fixed value predetermined by the power and power density of fuel cell stack while increasing seal length L would increase the probability of seal defect which adversely increases the risk of leaks. Based on the understanding of seal behavior during a crash event, it is desirable to provide a fuel cell with an energy attenuating seal bead to improve sealing integrity and crash resistance of fuel cell seal by having the same effect of increasing L without actually changing the dimensions and the design of fuel cell seal.

Therefore, in accordance with a non-limiting example, bipolar plate assembly 34 also includes an energy attenuating bead 100 that is designed to absorb acceleration forces so that seal beads 90, 94, 96, and 98 maintain sealing integrity during, for example, a crash event. In a non-limiting example, energy attenuating bead 100 may include a first section 108 that extends about a first portion (not separately labeled) of first peripheral edge 43 and a second section 110 that extends about a second portion (also not separately labeled) of first peripheral edge 43. In a non-limiting example, first section 108 is not connected to second section 110. However, it should be understood that energy attenuating seal bead 100 may extend about an entire periphery of bipolar plate assembly 34.

It should be further understood that while shown as being disposed outwardly of seal beads 90, 94, 96, and 98, the particular location of energy attenuating bead 100 may vary. For example, energy attenuating bead 100 could be disposed inwardly of seal bead 90, or between any one of seal beads 90, 94, 96, and 98. It should also be understood that while shown as being integrally formed with bipolar plate 56, seal beads 90, 94, 96, and 98 may be formed from different materials. For example, seal beads 90, 94, 96, and/or 98 may be formed from metal, non-metal, or any combination thereof. Thus, it should be understood that in a non-limiting example, the materials used to form seal beads 90, 94, 96, and 98 may be different from the material used to form bipolar plate 56 and/or different from the materials used to form each seal bead 90, 94, 96, and 98.

In a non-limiting example, seal beads 90, 94, 96, and 98 are formed from a first material having a first stiffness and energy attenuating bead 100 is formed from a second material having a second stiffness that is distinct from the first stiffness. Stiffness should be understood to be defined as an amount of vertically applied compressive force [N] required for unit displacement [nm] of seal bead deformation per unit length of seal bead [mm]. The second material may be identical to the first material with the differences in stiffness being attributed to manufacturing techniques, geometry, thickness, and the like. In a non-limiting example, the second stiffness may be half that of the first stiffness and as much as five (5) times greater than the first stiffness. In a non-limiting example, the second stiffness may be between one (1) and two (2) times greater than the first stiffness.

The amount of stiffness may determine to what extent energy attenuating bead 100 extends about first bipolar plate assembly 34. The greater the stiffness, the shorter the extent at which energy attenuating bead 100 extends about first bipolar plate assembly 34. Energy attenuating bead 100 is designed and positioned to realize acceleration forces before seal beads 90, 94, 96, and 98. In this manner, energy attenuating bead 100 may deform, and deflect thereby absorbing those acceleration forces so as to protect seal beads 90, 94, 96, and 98 and ensure an overall integrity of fuel cell system 30. It should be understood that the energy attenuating bead 100 is designed such that it would be under compressive force before a crash event. The compressive force establishes an unloading force range that accommodates a decrease in seal force in a trailing cells during a crash event and a loading force range that accommodates an increase of seal force in leading cells during the crash event.

It should be understood that, in accordance with a non-limiting example, seal beads 90, 94, 96, and 98 actually seal against first subgasket 41 and second subgasket 48 and prevent reactant egress. In contrast, energy attenuating bead 100 exerting a force on first subgasket 41 and second subgasket 48 is not designed to perform a sealing function. Further, it should be understood, that energy attenuating bead 100 exerts a force on first subgasket 41 and second subgasket 48 both under normal operation and during a crash event.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A fuel cell system comprising:
a plurality of stacked bipolar plate assemblies, each of the plurality of stacked bipolar plate assemblies comprising:
a first subgasket including a first peripheral edge, the first subgasket supporting a first membrane electrode assembly (MEA);
a second subgasket including a second peripheral edge, the second subgasket supporting a second MEA;
a bipolar plate disposed between the first subgasket and the second subgasket, the bipolar plate having a first side defining a first plurality of passages receptive of a cathode fluid, a second side defining a second plurality of passages receptive of an anode fluid, and a plurality of coolant passages defined between the first subgasket and the second subgasket;

a seal bead, being at least partially hollow, extending around the bipolar plate, the seal bead sealing against the first subgasket and the second subgasket; and an energy attenuating bead, being at least partially hollow, extending about the bipolar plate surrounding in a non-continuous manner, at least in part and being spaced between the seal bead and a peripheral edge of the bipolar plate, wherein the seal bead includes a first stiffness and the energy attenuating bead includes a second stiffness that is between two and five times greater than the first stiffness, wherein the seal bead and the energy attenuating bead are made of an identical material and a difference between the first stiffness and the second stiffness is due to the geometry of the seal bead and the energy attenuating bead.

2. The fuel cell system according to claim 1, wherein the energy attenuating bead includes a first section extending about a first portion of the bipolar plate and a second section extending about a second portion of the bipolar plate.

3. The fuel cell system according to claim 2, wherein the first section is not connected to the second section.

4. The fuel cell system according to claim 1, wherein the seal bead is continuous about the bipolar plate.

5. The fuel cell system according to claim 4, wherein the second stiffness is inversely proportional to an amount that the first section and second section of the energy attenuating bead extend about the bipolar plate.

6. The fuel cell system according to claim 1, wherein the bipolar plate is formed from a metal.

7. The fuel cell system according to claim 1, wherein the bipolar plate is formed from a non-metal.

8. The fuel cell system according to claim 1, wherein the geometry of the seal bead and the energy attenuating bead includes a thickness of the seal bead and the energy attenuating bead.

9. A power system comprising:
an electric motor; and
a fuel cell system including a plurality of stacked bipolar plate assemblies, each of the plurality of stacked bipolar plate assemblies comprising:
 a first subgasket including a first peripheral edge, the first subgasket supporting a first membrane electrode assembly (MEA);
 a second subgasket including a second peripheral edge, the second subgasket supporting a second MEA;
 a bipolar plate disposed between the first subgasket and the second subgasket, the bipolar plate having a first side defining a first plurality of passages receptive of a cathode fluid, a second side defining a second plurality of passages receptive of an anode fluid, and a plurality of coolant passages defined between the first subgasket and the second subgasket;
 a seal bead, being at least partially hollow, extending around the bipolar plate, the seal bead sealing against the first subgasket and the second subgasket; and
 an energy attenuating bead, being at least partially hollow, extending about and surrounding in a non-continuous manner, at least in part, the bipolar plate spaced from between the seal bead and a peripheral edge of the bipolar plate,
 wherein the seal bead includes a first stiffness and the energy attenuating bead includes a second stiffness that is between two and five times greater than distinct from the first stiffness, wherein the seal bead and the energy attenuating bead are made of an identical material and a difference between the first stiffness and the second stiffness is due to the geometry of the seal bead and the energy attenuating bead.

10. The power system according to claim 9, wherein the energy attenuating bead includes a first section extending about a first portion of the bipolar plate and a second section extending about a second portion of the bipolar plate.

11. The power system according to claim 10, wherein the first section is not connected to the second section.

12. The power system according to claim 11, wherein the second stiffness is inversely proportional to an amount that the first section and second section of the energy attenuating bead extend about the bipolar plate.

13. The power system according to claim 9, wherein the bipolar plate is formed from a metal.

14. The power system according to claim 9, wherein the geometry of the seal bead and the energy attenuating bead includes a thickness of the seal bead and the energy attenuating bead.

15. A vehicle comprising:
a body;
a power system arranged in the body, the power system comprising:
an electric motor; and
a fuel cell system including a plurality of stacked bipolar plate assemblies, each of the plurality of stacked bipolar plate assemblies comprising:
 a first subgasket including a first peripheral edge, the first subgasket supporting a first membrane electrode assembly (MEA);
 a second subgasket including a second peripheral edge, the second subgasket supporting a second MEA;
 a bipolar plate disposed between the first subgasket and the second subgasket, the bipolar plate having a first side defining a first plurality of passages receptive of a cathode fluid, a second side defining a second plurality of passages receptive of an anode fluid, and a plurality of coolant passages defined between the first subgasket and the second subgasket;
 a seal bead, being at least partially hollow, extending around the bipolar plate, the seal bead sealing against the first subgasket and the second subgasket; and
 an energy attenuating bead, being at least partially hollow, extending about and surrounding in a non-continuous manner, at least in part, the bipolar plate spaced from between the seal bead and a peripheral edge of the bipolar plate,
 wherein the seal bead includes a first stiffness and the energy attenuating bead includes a second stiffness that is between two and five times greater than the first stiffness, wherein the seal bead and the energy attenuating bead are made of an identical material and a difference between the first stiffness and the second stiffness is due to the geometry of the seal bead and the energy attenuating bead.

16. The fuel cell system according to claim 15, wherein the energy attenuating bead includes a first section extending about a first portion of the bipolar plate and a second section extending about a second portion of the bipolar plate.

17. The fuel cell system according to claim 16, wherein the first section is not connected to the second section.

18. The fuel cell system according to claim 17, wherein the second stiffness is inversely proportional to an amount that the first section and second section of the energy attenuating bead extend about the bipolar plate.

19. The fuel cell system according to claim 15, wherein the bipolar plate is formed from a metal.

20. The fuel cell system according to claim 15, wherein the geometry of the seal bead and the energy attenuating bead includes a thickness of the seal bead and the energy attenuating bead.

\* \* \* \* \*